J. R. FOUCH.
DYNAMOMETER.
APPLICATION FILED SEPT. 28, 1918.
1,303,786.
Patented May 13, 1919.
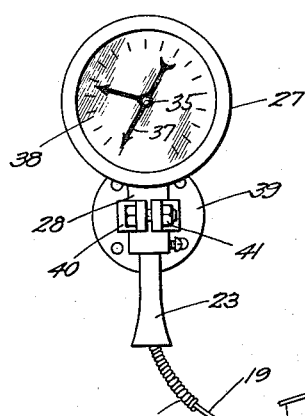
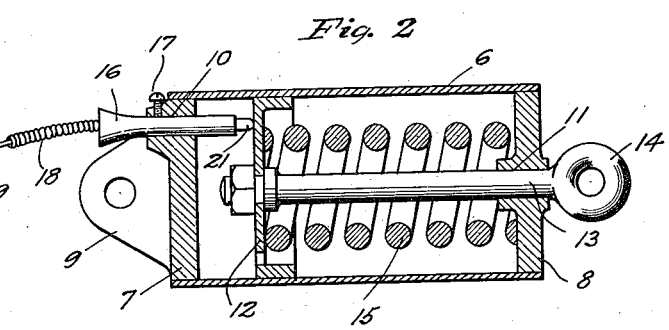
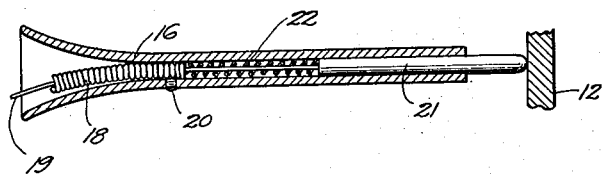
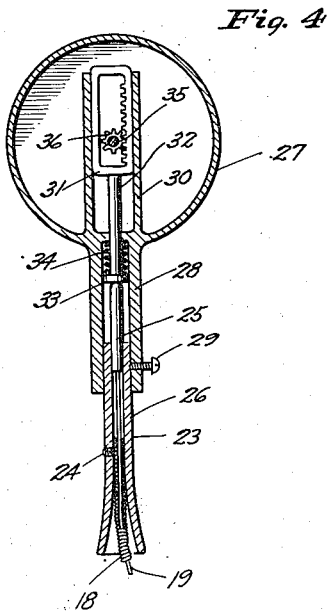
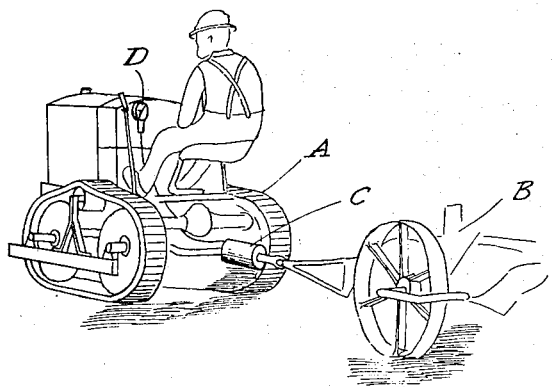
Inventor
James R. Fouch
by Nestall and Wallace
his Attorneys

UNITED STATES PATENT OFFICE.

JAMES R. FOUCH, OF LOS ANGELES, CALIFORNIA.

DYNAMOMETER.

1,303,786.　　　　　　Specification of Letters Patent.　　Patented May 13, 1919.

Application filed September 28, 1918. Serial No. 256,065.

*To all whom it may concern:*

Be it known that I, JAMES R. FOUCH, a citizen of the United States, residing at Los Angeles, in the county of Los Angeles and State of California, have invented new and useful Improvements in Dynamometers, of which the following is a specification.

My invention relates to improvements in dynamometers and pertains especially to the organization and construction of parts, whereby the indicating mechanism may be mounted upon a base whose position with respect to the measuring mechanism is variable.

Herein, for the purpose of illustration, I have disclosed a dynamometer for measuring the pull or force exerted between tractor and trailer elements, such as a tractor and plow. However, I do not limit my invention to such use in its broader aspects.

As disclosed herein, my invention comprises a force measuring mechanism adapted to be interposed between a tractor and a trailer, an indicating mechanism mounted on the tractor, and means connecting the indicating and force measuring mechanisms. In position such as described especially where the trailer is an agricultural implement, there is great flexibility between the tractor and implement. This results in relative movement between the draft rigging and tractor, and makes it extremely difficult to transmit movements of the measuring mechanism to the indicating mechanism, when the latter is mounted on either the tractor or trailer. It is the primary object of my invention to overcome these objections.

In addition to the broader features of my invention, there are certain features of construction, whereby a simple, efficient and strong structure is obtained.

In the drawings, Figure 1 is a front elevation of the indicator. Fig. 2 is a longitudinal section through the measuring mechanism, partly in elevation. Fig. 3 is an enlarged section through the Bowden wire connection to the measuring mechanism. Fig. 4 is an enlarged section through the indicator, and Fig. 5 is a perspective view of the dynamometer in position to measure the pull between a tractor and agricultural implement, a fragment of the latter being shown.

Referring particularly to Fig. 2, the measuring mechanism comprises a tubular casing 6 having heads 7 and 8. Head 7 has an eye 9 formed thereon for attachment to draft rigging, and an opening 10 for the reception of a Bowden wire connector. The head 8 is provided at the center with an opening 11 through which slidably extends a rod.

Mounted within the cylinder 6 is a reciprocating washer 12, and secured thereto is a rod 13, which extends through the opening 11 in head 8. The rod 13 is provided with an eye 14 for connection to the draft rigging of the implement to be dragged. Interposed between the washer 12 and the head 8 is a force spring 15, which resists movement of the washer 12 toward head 8. The movement of washer 12 against the action of the spring measures the pull exerted between eyes 9 and 14.

Referring particularly to Figs. 2 and 4, a Bowden wire connector 16 having a bell mouth at one end is inserted in opening 10 and held in position by a set screw 17. The Bowden wire as is well known consists of a flexible casing 18 in which snugly fits a wire 19, the latter being permitted to slide within the casing. The casing is connected in position so that it may be adjusted by means of a set screw 20 extending through the connector 16. The Bowden wire 19 is provided on the end with a plunger 21, and a compression spring 22 is interposed between the plunger and the casing 18, thereby insuring that the plunger will be held in contact with washer 12.

Figs. 1 and 2 show the relative position and relation of the indicator and measuring mechanism with a portion of the Bowden wire broken away. Referring particularly to Figs. 1 and 4, the Bowden wire is led into a connector 23, which is similar in construction to connector 16. A set screw 24 holds the casing 18 in position in the connector. The wire 19 is provided at its end with a plunger 25. The indicator comprises a cylindrical casing 27. Casing 27 is provided with a neck 28, into the bore of which extends the connector 23, and to which it is secured by means of a set screw 29. Extending from the neck 28 into the casing 27 is a guide 30 to receive a sliding rack 31. Rack 31 has a stem 32 provided with a head 33, which is in contact with the plunger 25. A compression spring 34 is interposed between the head 33 and the bottom of guide 30, thereby maintaining the head in contact with the plunger 25. Journaled in the casing 27 is a shaft 35, which has fixed thereon a pinion 36 in mesh with rack 36, so that reciprocation of the rack will cause rotation of the shaft 35. Secured to the end of shaft 35 is a hand 37, which moves over a dial 38. For the purpose of mounting the indicator on a tractor or the like, I have provided a base 39 having a split ring 40 for gripping the neck 28. By tightening the bolt 41 the indicator is securely clamped to the base. Screw holes are provided in the base for fastening the latter to any suitable portion of the tractor.

Referring to Fig. 5, A indicates a tractor and B an agricultural implement. Interposed between the draft rigging of A and B is the measuring mechanism C of the dynamometer. Mounted upon the tractor in a convenient position for reading is the indicator.

It is obvious that the pull exerted upon the implement by the tractor causes a compression of the force spring 15 and a consequent movement of the washer 12. The plunger 21 on the Bowden wire follows the washer 12 and movement is transmitted to the plunger 33 at the other end. This results in a proportionate movement of the rack 31 and a multiplied movement of the shaft 35. The movement of the hand 37 over the dial on the indicator thereby indicates the movement of disk 12 and the pull upon the implement by the tractor.

I do not wish to limit myself to the specific construction of either the measuring mechanism or the indicator. The important feature of my invention resides in the Bowden wire connection or its equivalent, whereby motion is accurately transmitted from a measuring implement to an indicator through a flexible connection.

What I claim is:

1. A dynamometer connecting a tractor and trailer element, said dynamometer comprising in combination measuring mechanism, an indicator fixedly mounted on one of said elements, means for communicating motion from said mechanism to said indicator and permitting variation in the position of said mechanism and said indicator.

2. A dynamometer connecting vehicles, said dynamometer comprising in combination measuring mechanism, an indicator fixedly mounted on one of said vehicles, and flexible motion transmitting means communicating motion from said measuring mechanism to said indicator.

3. A dynamometer connecting tractor and trailer elements, said dynamometer comprising a measuring mechanism, an indicator fixedly mounted on one of said elements, and a Bowden wire for transmitting motion from said measuring mechanism to said indicator, whereby the relative position of said mechanism and said indicator may be varied.

In witness that I claim the foregoing 1 have hereunto subscribed my name this 19th day of September, 1918.

JAMES R. FOUCH.